United States Patent Office 3,406,706
Patented Oct. 22, 1968

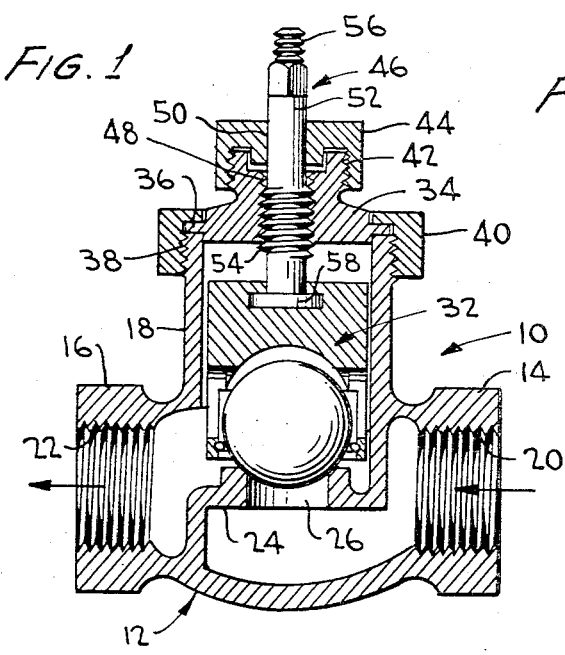
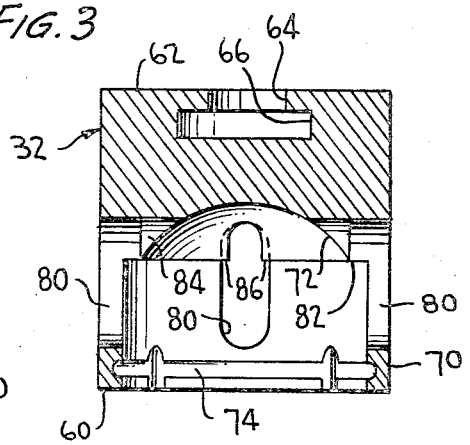
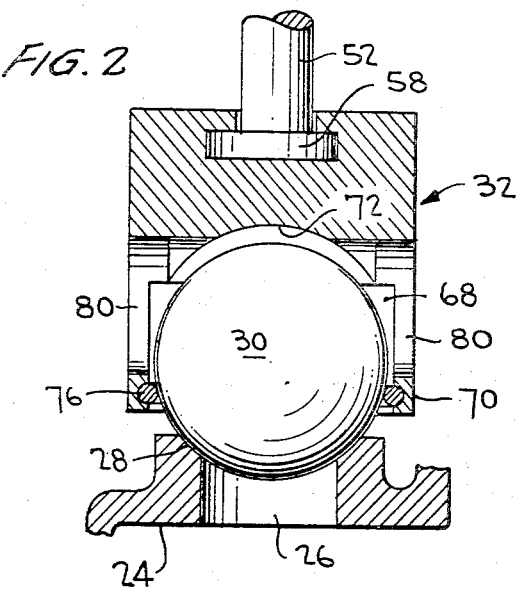
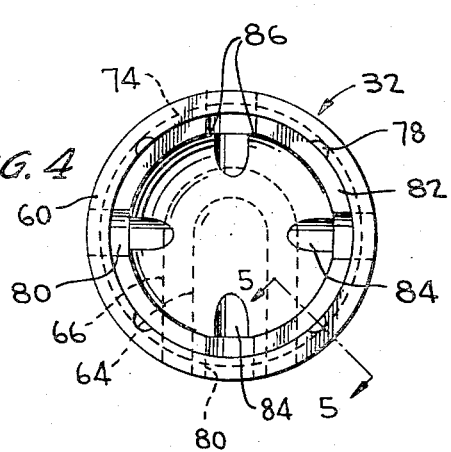
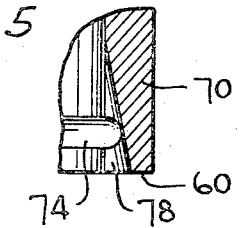

3,406,706
BALL VALVE ASSEMBLY INCLUDING SNAP
RING RETENTION MEANS
Jorge C. F. C. Zakka, Lope de Vega 504-8,
Mexico City 5, Mexico
Continuation-in-part of application Ser. No. 303,193,
July 29, 1963. This application Sept. 6, 1966, Ser.
No. 577,225
3 Claims. (Cl. 137—331)

This application is a continuation-in-part of my copending application Ser. No. 303,193, filed July 29, 1963, and now abandoned.

This invention relates to fluid valve assemblies and more particularly it relates to an improved ball valve type of assembly.

In particular, the subject invention is directed to a valve assembly utilizing a spherical ball member as the valve element, whereby, when the spherical ball is seated, the valve is closed and whereby, when the spherical ball is unseated, the valve is open. The construction and assembly of the subject invention is such that the spherical ball is free to rotate or move freely when the valve is in "open" position, thereby assuring that no portion of the ball will be subjected to uneven wear with respect to another point thereon.

While all valve units of this type have been generally known in the art, the subject invention is directed to an improvement over such existing units, such improvement being directed specifically to the support means for the spherical ball. This support means, which is sometimes referred to as a cage means, is in the present invention of a type which readily permits a ball to be introduced into the interior thereof or removed therefrom, which provides an improved seat therewithin for the ball element, and which provides for improved fluid flow or communication between the interior of the cage and the exterior thereof, to thereby assure free rotation of the ball during its "open" position.

With the foregoing in mind, it is, therefore, a primary object of the present invention to provide a new and improved ball valve assembly including the aforementioned features.

Another object of the present invention is to provide a ball valve assembly which is selectively movable between an open and closed position, and wherein the ball itself is free to rotate when the valve is in open position.

Another object of the present invention is to provide a ball valve assembly of the type described herein, which is relatively inexpensive to produce, yet which satisfactorily accomplishes the functions desired thereby.

Other objects, advantages, and salient features of the present invention will become apparent from the following detailed description, which, taken in conjunction with the annexed drawing, discloses a preferred embodiment thereof.

Referring to the drawing:

FIGURE 1 is a sectional view of a ball valve assembly in accordance with the principles of the present invention;

FIGURE 2 is an enlarged fragmentary sectional view of the ball member and its support means;

FIGURE 3 is a sectional view of the support means itself, without the ball member being retained therewithin;

FIGURE 4 is a bottom plan view of the support means shown in FIGURE 3; and

FIGURE 5 is a fragmentary sectional view taken substantially along the line 5—5 of FIGURE 4.

Referring now to FIGURE 1, there is shown therein a ball valve assembly which is generally designated 10 and which includes a valve housing generally designated 12 having aligned ends 14 and 16 and an upstanding neck 18. The end 14 having a threaded opening 20 therewithin serves to define the fluid inlet portion of the valve, while the end 16 having a threaded opening 22 therewithin serves to define the outlet portion of the valve.

The casing 12 includes an integral internal baffle wall 24 having a horizontal portion with an opening means or aperture 26 therewithin. The upper portion of the baffle wall forming the border surrounding the opening 26 defines a valve seat 28 which is arcuately contoured to receive a portion of the spherical ball within the valve, as shown in FIGURE 1 and in greater detail in FIGURE 3.

A spherical ball 30 formed of metal or other suitable material, is mounted within a support means generally designated 32 and is movable toward and away from the valve seat 28. When the ball 30 is seated upon the valve seat 28, the opening means 26 is closed, thereby blocking communication between the inlet and outlet portions of the valve assembly 10. However, when the ball 30 is moved away from the valve seat 28, the inlet and outlet portions communicate with each other through the opening means 26, thereby providing for a flow through the valve assembly 10.

A hub member 34 is disposed above the neck 18 of the valve casing with such hub member including a flange 36 which rests upon the end surface of the neck. The outer surface of the neck 18 is externally threaded at 38 near the end thereof whereby a cap 40 having mating internal threads can be utilized to clamp or sandwich the flange 36 against the outer end of the neck, as shown in FIGURE 1. The upper end of the hub 34 is externally threaded at 42 for mounting a small cap member 44 having compatible internal threads.

A movable operating means generally designated 46 extends through the cap 44 and the hub 34 and is coupled with the support means 32. As such, the hub 34 is provided with a central threaded aperture 48 aligned with a central bore 50 in the cap member 44. The movable operating means includes an elongated shaft 52 having a threaded portion 54 which engages with the threads of the hub aperture 48 and a nonthreaded portion which fits through the bore 50 in the cap 44. The upper end of the shaft 52 is threaded at 56 to permit the mounting of an operating element, such as a knob or the like. The lower end of the shaft 52 is formed by a flat plate 58 which serves to mount the support means 32.

Referring now to the support means 32, it can be seen from FIGURES 2 through 4 that the same includes a generally cylindrical cage means of a size which permits the same to move within the neck 18 of the valve casing 12. The cage means includes an inner end 60 spaced closest to the valve seat 28 and an outer end 62 spaced furthest away therefrom. A slot means extends from one side of the cage means to substantially the center thereof for permitting reception of the movable operating means 46. This slot means includes a first slot 64 communicating with the outer end 62 and of a width sufficient to accommodate the shaft 52. The slot means also includes a larger slot 66, communicating with the aperture 64, and of a size sufficient to permit reception of the plate 58. Thus, to couple the support means 32 with the movable operating means 46, the lower end of the shaft 52 carrying the plate 58 is slid into the slots 64 and 66. When the plate 58 has been fully slid into the slot 66, to contact its closed or blind inner end, the support means 32 will be coupled with the movable operating means 46 and will be movable in unison therewith. Hence, thereafter, when the shaft 52 is rotated in one direction, the inner end 60 of the support means will be moved toward the valve seat 28, and when the shaft 52 is rotated in the opposite direction, the inner end 60 will be moved away from the valve seat 28.

The cage means includes an internal cavity 68 extending from the inner end 60 thereof but terminating short of the outer end 62 thereof. This internal cavity 68 serves to mount the spherical ball 30.

More specifically, the cage means includes a continuous side wall 70 of substantially uniform thickness extending from the inner end 60 toward the outer end 62. The inner surface of this side wall 70 circumscribes and surrounds a cylindrical portion of the internal cavity 68. The inner surface of the side wall 70 merges with a ball seat portion 72 which serves as the inner end of the cavity 68. The ball seat portion 72 is formed as a spherical portion, less than a hemisphere, with the radius of curvature of the ball seat portion 72 being substantially equal to the radius of curvature of the spherical ball 30. The cross sectional dimension or diameter of the cylindrical portion of the internal cavity 68 is greater than the diameter of the spherical ball 30, thereby assuring that the spherical ball 30 can rotate freely while the same is disposed within the internal cavity 68.

An annular groove 74 is formed along the inner surface of the side wall 70, adjacent the inner end 60 of the cage means. A snap ring means 76 in the form of a split ring is disposed within the annular groove 74 for the purpose of mounting the ball 30 within the internal cavity 68. The snap ring means 76 has an effective diameter less than the diameter of the spherical ball 30, and therefore, when the spherical ball 30 is positioned in the internal cavity 68 and the snap ring 76 is positioned within the annular groove 74, the major portion of the spherical ball 30 remains within the internal cavity but a minor portion thereof is permitted to project beyond the inner end 60 of the cage means, as shown in FIGURE 2.

At least one, and preferably a plurality of angularly directed tapering channels 78 extend from the inner end 60 along the internal surface of the side wall 70. These channels 78 intersect the annular groove 74 to permit insertion of a tool or instrument for inserting the snap ring 76 into the annular channel 74, or for removing the snap ring 76 therefrom.

The side wall 70 includes a plurality of spaced fluid ports 80 in the form of elongated slots. These slots or ports extend through the side wall 70 from a point just above the annular groove 74 to a point just beneath the top of the ball seat portion 72. The purpose of these fluid ports is to permit fluid communication between the internal cavity 68 and the exterior of the cage means. It will be noted that the thickness of the side wall 70 is increased in the area of the ball seat portion 72 to provide an internal step or shoulder 82 which extends between the bottom of the ball seat portion 72 and the inner surface of the side wall 70. The reason for the presence of the shoulder 82 is because the effective diameter of the internal cavity is somewhat greater than the width of the ball seat portion 72 at the bottom or inner end thereof. As can be seen, the fluid ports 80 extend fully through the side wall means 70, both below and above the shoulder 82.

The ball seat portion 72 includes a plurality of channel portions 84 extending laterally outwardly from a level equal to the top of the fluid ports 80. Each of these channel portions 84 is aligned with a fluid port 80 but is somewhat narrower in width than the fluid port. As a result, a pair of fins 86, 86 extend partially across the upper portions of the fluid ports 80, along the inner surface thereof. The presence of the fins 86 serves to increase the effective size of the ball seat portion 72, thereby reducing any wear on the ball 30. Additionally, the presence of the fins 86 serves to reduce the effective size of the flow passage through the ports 80 and channels 84. This creates a venturi-type action which accelerates fluid flow at the top of the fluid ports 80, and which thereby serves to impart a turning or rotating force or moment on the spherical ball 30 while the same is retained within the internal cavity 68.

With the foregoing descriptive matter in mind, the operation of the present invention should become apparent. When the operating means 46 is actuated by rotating the shaft 52, the entire support means 32, and the spherical ball 30 retained therewithin, can be moved toward or away from the valve seat 28. When the shaft 52 is rotated to raise the ball 30 out of contact with the valve seat 28, the opening means 26 establishes communication between the inlet and outlet portions of the valve assembly 10. Thus, fluid flow through the valve is accomplished with a portion of this fluid flow extending upward into the interior of the neck 18 of the valve casing. This fluid flow tends to lift the ball 30 out of contact with the snap ring means 76 and to thereby rotate the same within the internal cavity 68. Simultaneously, a portion of the fluid will flow through the fluid ports 80 and into the internal cavity 68 within the supporting means 32. This fluid will likewise tend to cause a rotation of the ball 30. Finally, at the upper end of the fluid ports 80, the fins 86 serve to accelerate the fluid flow somewhat, thereby imparting an additional turning or rotating fluid force upon the spherical ball 30. All of these fluid forces tend to cause the ball 30 to rotate freely within the internal cavity 68. As such, the same portion of the ball will not always contact the ball seat portion 72, or the snap ring means 76, or the valve seat 28, and hence undue wear upon the spherical ball 30 will be eliminated.

It is important to note that the major portion of the spherical ball, i.e., that portion within the internal cavity 68 beyond the snap ring means 76, is somewhat smaller than the dimension from the snap ring means 76 to the top of the ball seat portion 72. In other words, when the fluid imparts a slight lifting force upon the ball 30, such ball can assume a position where the same is out of contact with both the ball seat portion 72 and the snap ring means 76, thereby assuring a free rotation without any frictional contact with a supporting surface.

When the operating means 46 is actuated by turning the shaft so that the supporting means 32 is moved toward the valve seat 28, the ball will eventually move into contact with the valve seat 28 in the manner shown in FIGURE 2. Thereafter, a slight further rotation of the shaft 52 will lower the supporting means until the ball 30 is seated tightly against the ball seat portion 72. However, because the ball seat portion 72 is provided with an arcuate curvature substantially identical with the curvature of the ball 30, contact with the ball seat portion will not provide any undue amount of wear or deformation of the ball 30. This can be readily contrasted with prior art forms of devices wherein the inner end of the shaft itself, such as the plate 58, made direct contact with the top surface of the ball 30 to impart a downward pressure or force to only one small point along the ball. The partially spherical formation of the ball seat 72 of the present invention assures that the downward forces will be distributed over a substantial portion of the surface of the ball 30, thereby prolonging the life thereof and preventing any undesired deformation thereof which could lead to valve leakage. Naturally, once the ball is firmly seated between the valve seat 28 and the ball seat portion 72, fluid flow through the opening means 26 is blocked or terminated, and the valve assembly is in a closed condition.

After reading the foregoing detailed description, it should be apparent that the objects set forth at the outset of this specification have been successfully achieved by the present invention.

What is claimed is:

1. In a ball valve assembly including a valve housing having an inlet portion and an outlet portion and a baffle wall disposed therebetween, said baffle wall having an opening means therewithin for establishing communication between said inlet and outlet portions, a spherical ball adapted to seat against the periphery of said opening means to block communication between said inlet and outlet portions, support means within which said sphere is mounted, and movable operating means for selectively moving said support means and the spherical ball therewithin, the improvement in said support means comprising:

a generally cylindrical cage means having an inner end spaced closest to said opening means and an outer end spaced furthest away therefrom;

said cage means including an internal cavity therewithin extending from said inner end but terminating short of said outer end in a ball seat portion;

said cage means including a continuous side wall of substantially uniform thickness extending from said inner end toward said outer end, said side wall having an inner surface which circumscribes and surrounds a cylindrical portion of said internal cavity;

said inner surface of said side wall merging with said ball seat portion;

said ball seat portion being formed with a spherical surface less than a hemisphere, with the radius of curvature of said surface of said ball seat portion being substantially equal to the radius of curvature of said spherical ball;

said cylindrical portion of said internal cavity having a cross-sectional dimension greater than the diameter of said spherical ball, thereby assuring that said spherical ball can rotate freely within said internal cavity;

said side wall including a plurality of spaced fluid passages therewithin, said fluid passages at least partially intersecting said surface of said ball seat portion;

said side wall including an annular groove formed along the inner surface thereof adjacent said inner end;

snap ring means disposed within said annular groove and engaged with the surface of said spherical ball to maintain the same within said internal cavity;

said snap ring means having an effective diameter less than the diameter of said spherical ball to maintain the major portion of said spherical ball within said internal cavity while permitting a minor portion thereof to project beyond said inner end;

said support means being movable upon operation of said operating means to a closed position whereat said spherical ball is tightly seated against both the periphery of said opening means and said ball seat portion, thereby blocking communication between said inlet and outlet portions;

said support means also being movable upon operation of said operating means to an open position whereat said spherical ball is out of contact with both said periphery of said opening means and said ball seat portion, thereby permitting communication between said inlet and outlet portions;

said spherical ball being freely rotatable within said internal cavity when said valve assembly is in said open position, said fluid passages serving to establish communication between said fluid and said internal cavity whereby said fluid can aid in effecting free rotation of said spherical ball.

2. The improvement defined in claim 1 wherein said side wall includes at least one angularly directed tapering channel extending from said inner end and intersecting said annular groove to facilitate insertion and removal of said snap ring means.

3. The improvement defined in claim 1 wherein the portion of each of said fluid passages which intersects said surface of said ball seat portion is narrowed to form fins extending partially across said passages.

References Cited

UNITED STATES PATENTS

| 140,006 | 6/1873 | Brown | 251—83 X |
|---|---|---|---|
| 529,692 | 11/1894 | Bavier | 251—86 X |
| 807,476 | 12/1905 | Leidecker | 251—82 |
| 981,087 | 1/1911 | Hoyt | 251—83 X |
| 994,268 | 6/1911 | Milne | 251—88 |
| 1,115,256 | 8/1914 | Torbert | 251—82 |
| 1,173,728 | 2/1916 | Milne | 251—88 |
| 2,841,167 | 7/1958 | Jacobson | 251—86 X |

FOREIGN PATENTS

| 628,470 | 4/1936 | Germany. |
|---|---|---|

ARNOLD ROSENTHAL, *Primary Examiner.*